United States Patent
Yamauchi et al.

(10) Patent No.: US 7,563,536 B2
(45) Date of Patent: Jul. 21, 2009

(54) PRISMATIC SEALED SECONDARY BATTERY HAVING A CASE MADE OF METAL MATERIALS AND METHOD FOR MANUFACTURING THE SAME

(75) Inventors: Yasuhiro Yamauchi, Tsuna-gun (JP); Tomokazu Yamanaka, Sumoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 900 days.

(21) Appl. No.: 10/986,658

(22) Filed: Nov. 12, 2004

(65) Prior Publication Data

US 2005/0106453 A1    May 19, 2005

(30) Foreign Application Priority Data

Nov. 14, 2003    (JP)    .............................. 2003-385767

(51) Int. Cl.
*H01M 2/02*    (2006.01)
(52) U.S. Cl. ...................................... 429/171; 429/163
(58) Field of Classification Search ................. 429/163, 429/176, 166, 168, 169, 171
See application file for complete search history.

(56) References Cited

U.S. PATENT DOCUMENTS

| | | | |
|---|---|---|---|
| 6,264,708 B1 * | 7/2001 | Haraguchi et al. | ......... 29/623.2 |
| 6,379,839 B1 | 4/2002 | Inoue et al. | |
| 2002/0034680 A1 | 3/2002 | Inoue et al. | |

* cited by examiner

*Primary Examiner*—Patrick Ryan
*Assistant Examiner*—Monique Wills
(74) *Attorney, Agent, or Firm*—Westerman, Hattori, Daniels & Adrian, LLP.

(57) ABSTRACT

This invention aims to provide a prismatic sealed secondary battery which is capable of ensuring a high battery capacity and suppressing the case swelling and which achieves high quality in appearance at low cost, and the method for manufacturing the same. To achieve the above objectives, the prismatic sealed secondary battery of the present invention has a structure in which an open end of the case that houses an electrode assembly therein is sealed by a sealing cap. On the main plane of the case, linear heat strain signatures are created. Additionally, depressions are formed along the heat strain signatures that are a principal cause of the depressions. On the case, within an area where the heat strain signatures have been created, a portion composed of a recrystallized structure is formed. This portion is, on cross section, fanned out inwardly the case plate from the center of linewidth of each heat strain signature.

7 Claims, 9 Drawing Sheets

FIG.1
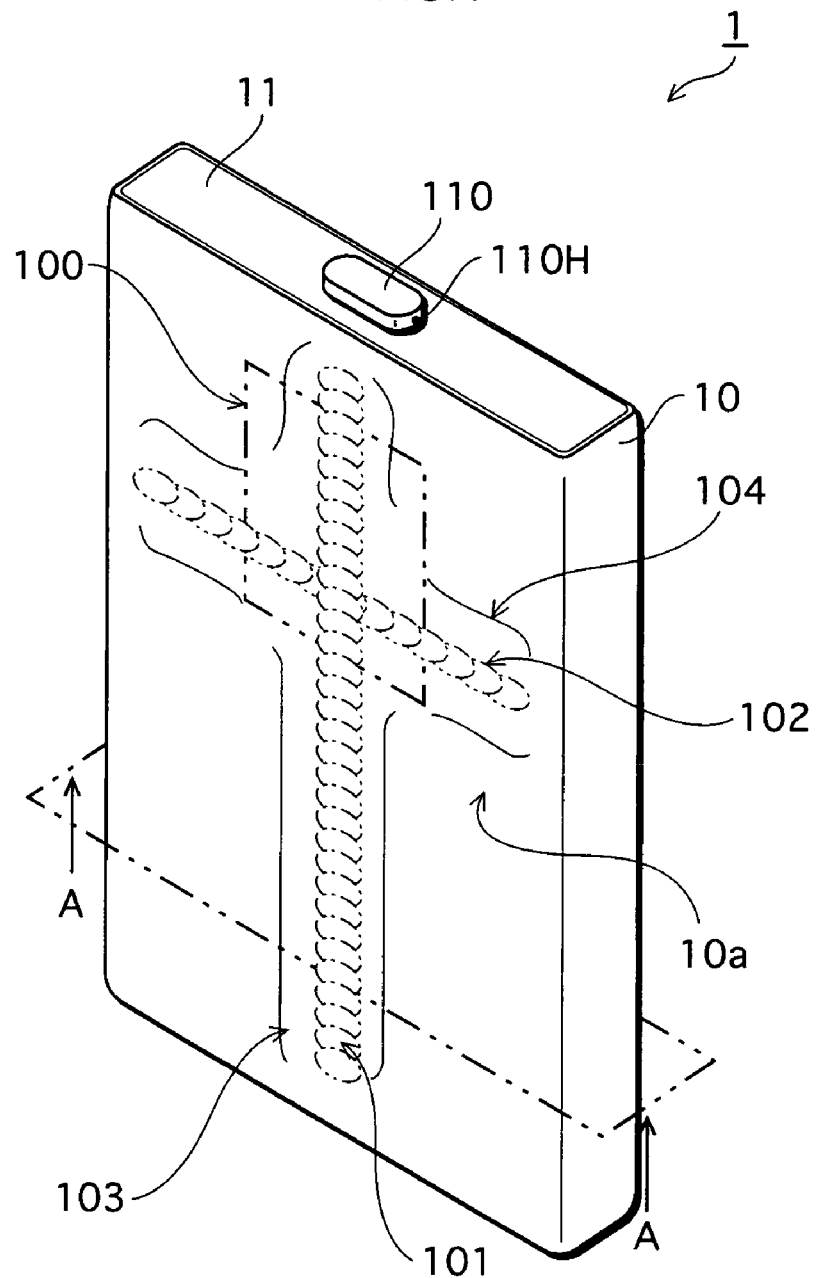
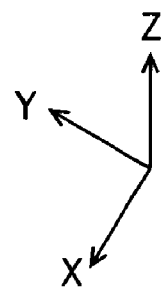

FIG.5A
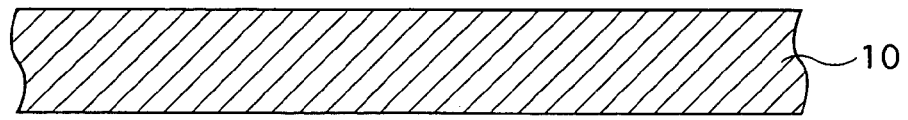
FIG.5B
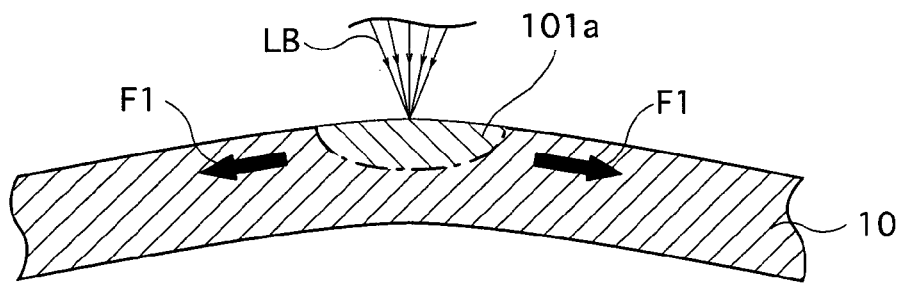
FIG.5C
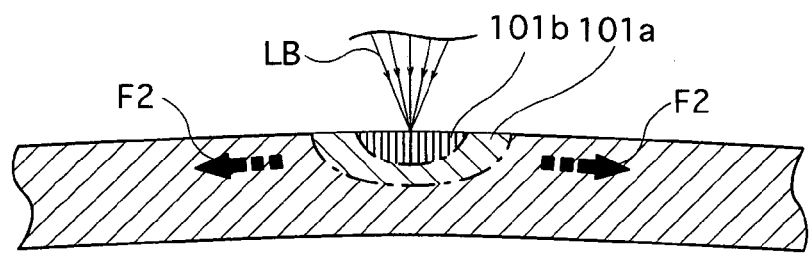
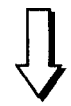
FIG.5D
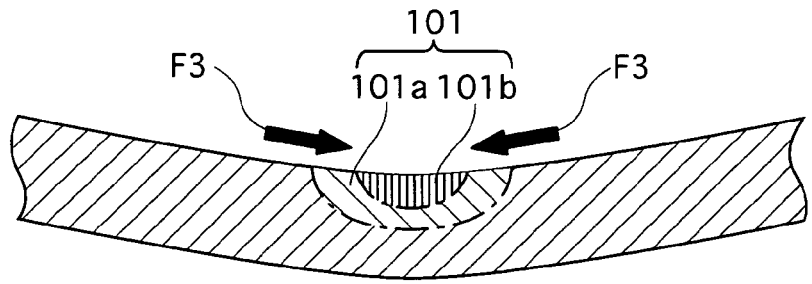

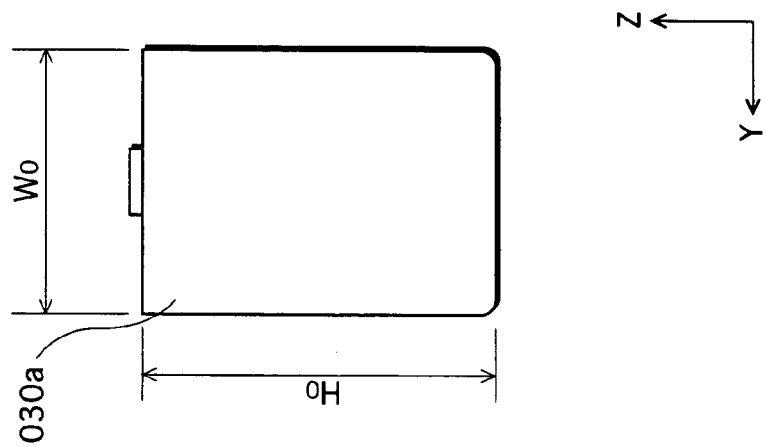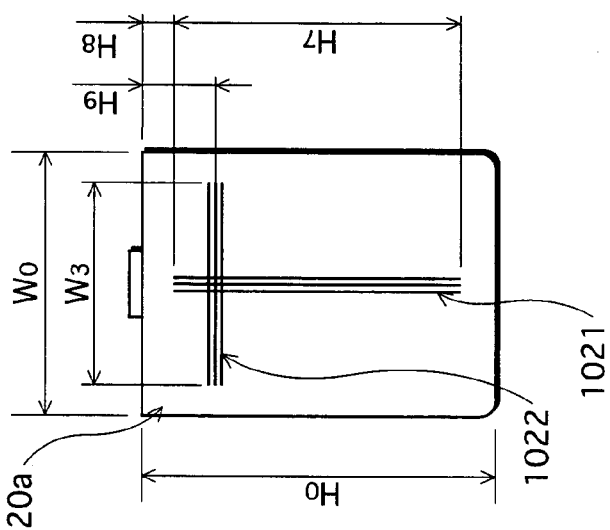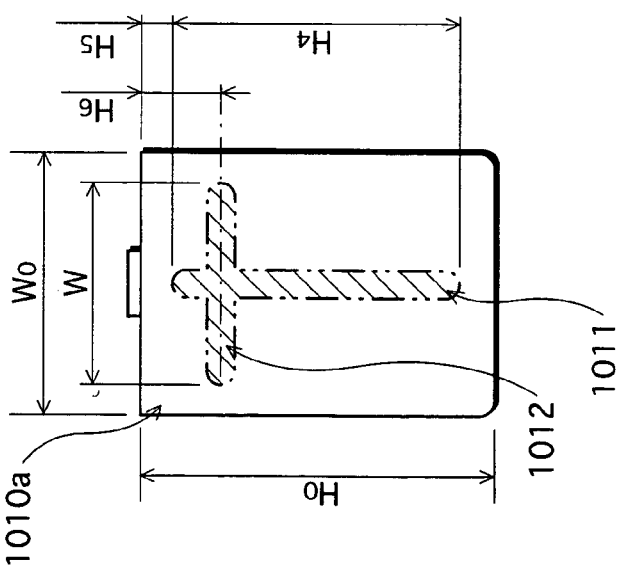

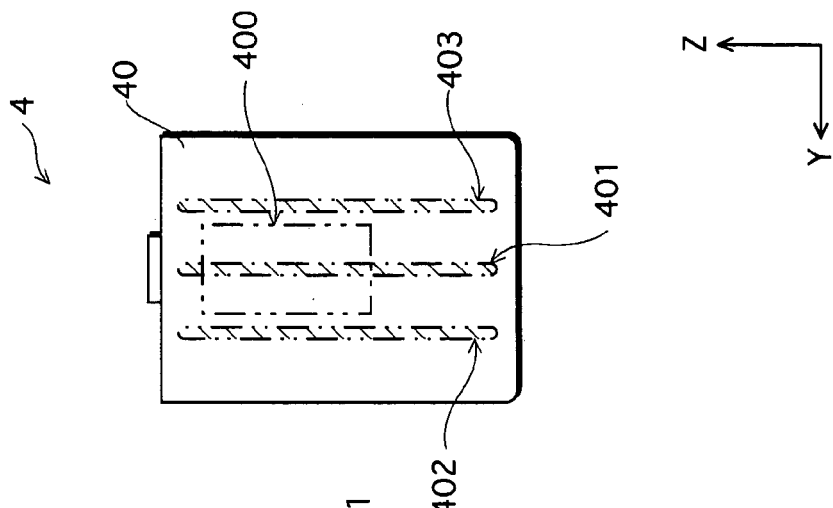
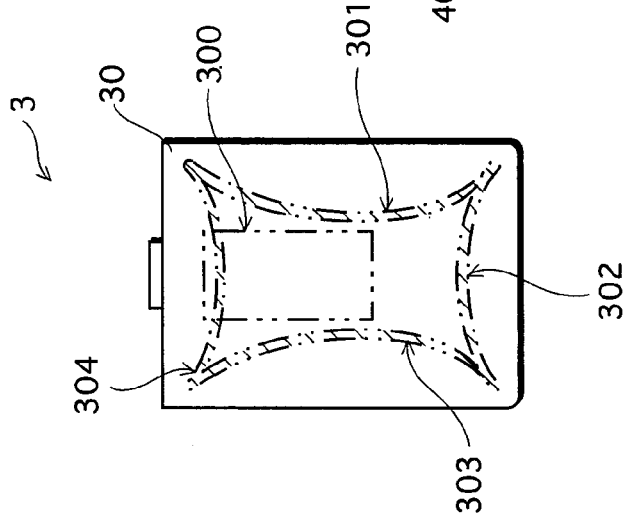
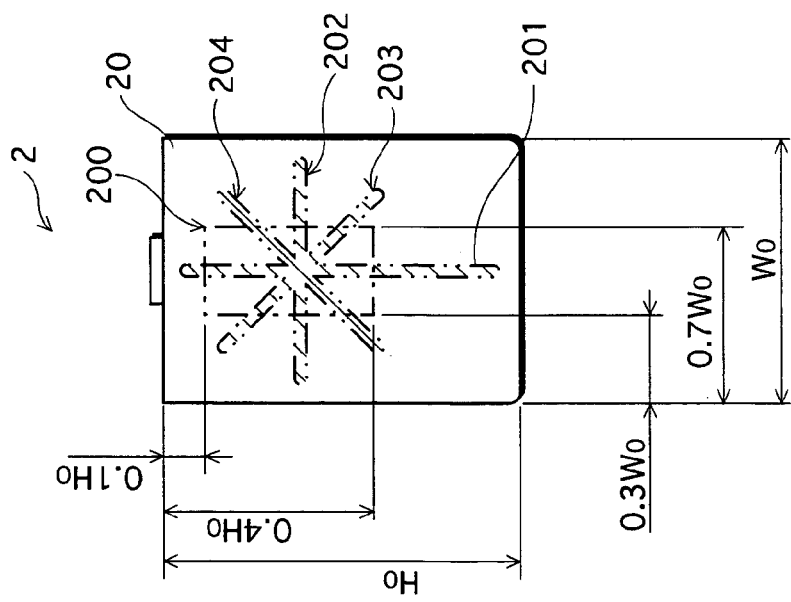

FIG.9A
FIG.9B
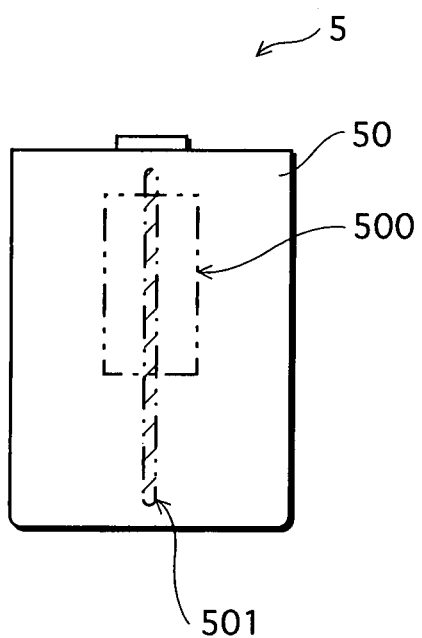
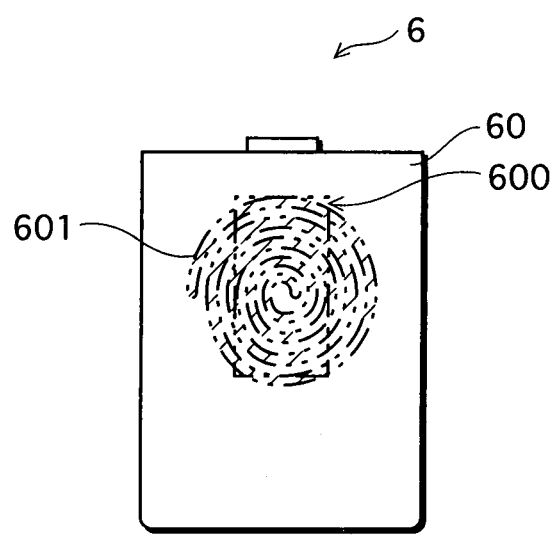
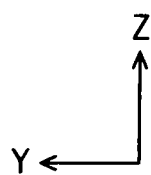

PRISMATIC SEALED SECONDARY BATTERY HAVING A CASE MADE OF METAL MATERIALS AND METHOD FOR MANUFACTURING THE SAME

BACKGROUND OF THE INVENTION

1. Field of the Invention

The present invention relates to a prismatic sealed secondary battery having a case made of a metal material and a method for manufacturing the same, in particular to a technology for suppressing swelling of the case when the battery is being charged, has gone through several charge-discharge cycles, or has been left in an elevated temperature environment.

2. Related Art

The spread of sealed secondary batteries as electrical power sources for portable devices, such as PDAs, is remarkable in late years. Especially, prismatic sealed secondary batteries (hereinafter referred to simply as "prismatic batteries") have been brought to attention due to their increased space efficiency and such when attached to devices.

The prismatic batteries have a structure in which the open end of the case is sealed by a sealing cap with an electrode assembly and like housed in the prismatic tubular case having a bottom, and the prismatic tubular case is made of a metal material. For prismatic batteries having such a structure, as with other forms of batteries, there is a demand for compatibility between higher capacity and a reduction in size and weight, and the prismatic batteries are required to have as large an electrode assembly as possible within specified outside dimensions. Therefore, a case with thin plate thickness of 0.2-0.4 mm is generally used for the prismatic batteries. In addition, when the prismatic batteries are attached to devices, there is little clearance between the outer surface of the case and the device having the battery attached thereto in order to improve space efficiency and like of the device.

As to sealed secondary batteries including the prismatic batteries, the internal pressure increases due to, for example, the expansion of gases generated from electrode plates, which are components of the electrode assembly, and/or the swelling of the electrode assembly when the sealed secondary batteries are being charged, have gone through several charge-discharge cycles, or have been left in an elevated temperature environment. When the internal pressure of the batteries exceeds a given value, it is sometimes the case that the swelling occurs in main planes of the case. This is especially pronounced in the prismatic batteries. By taking into consideration the fact that, when the sealed secondary battery is attached to a device, there is little clearance between them, such swelling of the case becomes a problem even if the amount of the swelling is small. Consequently, it is desired that the case swelling be suppressed as much as possible.

In order to suppress such case swelling of the prismatic batteries, various measures are being taken. The followings are examples of such measures that have been developed: a technology for improving the strength of the case by hardening it with use of a laser beam irradiation on the case surface (Japanese Laid-Open Patent Application Publication No. 2002-110108); and a technology for creating grooves arranged in an X pattern on the case by press working before the electrode assembly is housed therein and herewith improving the strength of the case (Japanese Laid-Open Patent Application Publication No. 2001-57179).

A method of suppressing the case swelling by so-called a laser forming process has also been studied. In the process, a laser beam is irradiated on the main planes of the case in order to cause the irradiated parts to melt. Subsequently, the irradiated parts cool off and then resolidify. Thus, by forming parts composed of a recoagulated structure, the case is dented inward centering around the laser irradiation signatures.

However, the technology disclosed in the above-mentioned Japanese Laid-Open Patent Application Publication No. 2002-110108 is, in general, hardly effective for Al—Mn alloys (Japanese Industrial Standard: 3000-series) used for cases of the prismatic batteries. This is because the 3000-series Al alloys have characteristics of little hardening by heat treatments, including the treatment by laser beam irradiation. If a type of Al alloys which can be easily hardened by quenching (2000-, 6000-, and 7000-series) is used for the case, a problem of less weldability will arise since these Al alloys contain Mg in the compositions. For this reason, these Al alloys cannot be practically used for the case.

The technology disclosed in the above-mentioned Japanese Laid-Open Patent Application Publication No. 2001-57179 requires the press working on the case before the electrode assembly is placed therein, and the size of the electrode assembly has to be set smaller by the depth of the grooves. Accordingly, this technology does not satisfy the requirement that the prismatic batteries must have the highest possible capacity within the limited outside dimensions.

Compared to the technologies disclosed in the former two documents (Japanese Laid-Open Patent Application Publications No. 2002-110108 and 2001-57179), the above-mentioned technology using the laser forming process excels in accomplishing the objectives for ensuring a high battery capacity and suppressing the case swelling. However, these objectives can only be achieved when a plurality of linear laser irradiation signatures aligned parallel to each other are created on the main planes of the case. Therefore, this technology remains a problem in terms of working efficiency. That is, this method requires at least a plurality of parallel laser irradiation signatures to be created so that a sufficient area of the main planes of the case is subjected to heat strain. Herewith, this method takes a large number of manufacturing stages required for the process, and therefore the method requires improvement in terms of mass production.

Additionally, in the above technology using the laser forming process, each laser irradiation signature remains conspicuous, which is undesirable for quality in appearance. Furthermore, the depressions formed in this method have large dip angles, and this may cause wrapping film of the case to lift from the case surface.

SUMMARY OF THE INVENTION

The present invention was made in order to solve the above problems, and aims to provide a prismatic sealed secondary battery which is capable of ensuring a high battery capacity and suppressing the case swelling and which achieves high quality in appearance at low cost. In addition, the present invention also aims to provide a method for manufacturing such a prismatic sealed secondary battery.

In order to accomplish the above objectives, as considering both advantages and disadvantages of the above-mentioned technology using the laser forming process, the inventors of the present invention earnestly concentrated their thoughts on improving the mass productive. Consequently, they reached a conclusion that the above problems could be solved by employing the following features.

A prismatic sealed secondary battery of the present invention comprises at least an electrode assembly, a case, and a sealing cap.

The electrode assembly is composed of a positive electrode, a negative electrode, and a separator sandwiched between the positive electrode and the negative electrode. The case is made of a metal material formed in one or more plates, has a prismatic tubular shape with four lateral planes, one open end, and one closed end, and has an internal space in which the electrode assembly is housed. The four lateral planes are composed of two main planes and two secondary planes. The main planes are laid along a direction intersecting thickness of the positive electrode or the negative electrode. The sealing cap joined with the open end to seal the internal space. Here, on at least one of the main planes, one or more linear heat strain signatures formed as a result of an application of heat are created. One or more depressions are formed, surrounding the linear heat strain signatures, with the heat strain signatures being the principal cause of the formation of the depressions. The prismatic sealed secondary battery of the present invention is characterized by a linear portion formed within each of the linear heat strain signatures. The linear portion is, on cross section, fanned out inwardly toward the case plate from the center of a width of the linear heat strain signature, and is composed of the recrystallized structure.

In the prismatic sealed secondary battery of the present invention, the depressions are formed largely owing to the heat strain signatures. In addition, within where each of the heat strain signatures is created, there is a portion composed of the recrystallized structure. This portion is, on cross section, fanned out inwardly the case plate from the center of the linewidth of the heat strain signature on the external surface of the case. In other words, as with the prismatic sealed secondary battery of the present invention, the depressions are formed, for example, by irradiating an energy beam that is controlled so that the surface temperature of the irradiated area stays within the range no lower than a recrystallization temperature but below a melting point of a material of the case.

In the above conventional technology using the laser forming process, the irradiation is implemented with the energy density at which the surface temperature of the irradiated area reaches no lower than the melting point. In this situation, it is required to create depressions by strain, and the spot diameter of the laser beam has to be set small in order to curb the impact on the electrode assembly housed inside. In this case, the depressions effective in suppressing the case swelling cannot be formed by creating laser irradiation signatures having only one single line, and therefore multiple-line laser irradiation signatures, in which a plurality of lines are running side-by-side with one another, have to be provided as noted above.

In the prismatic sealed secondary battery of the present invention, on the other hand, the heat strain signatures are created, each of which includes a portion fanned out inwardly the case plate on cross section and composed of the recrystallized structure, and depressions are formed owing to these heat strain signatures. As a result, in the prismatic sealed secondary battery of the present invention, the energy density at the irradiated area is reduced compared to the above conventional method using the laser forming process. Consequently, the prismatic sealed secondary battery of the present invention is able to provide a larger area for irradiation and form depressions effective in suppressing the case swelling by creating single-line heat strain signatures as avoiding the impact on the electrode assembly housed inside, and has advantages on the manufacturing cost. Note that the prismatic sealed secondary battery of the present invention is capable of effectively suppressing the case swelling which occurs when the battery is, for example, being charged, has gone through several charge-discharge cycles, or has been left in an elevated temperature environment.

As seen in the above conventional technology, when depressions are formed by creating heat strain signatures having a narrow linewidth, these depressions have large dip angles, and this is undesirable for quality in appearance. On the other hand, since the present invention forms depressions using heat strain signatures having a wider linewidth, the depressions have small dip angles and therefore the prismatic sealed secondary battery of the present invention has high quality in appearance. Furthermore, it is less likely that air remains in the depressions when the case is wrapped with film. Again from this aspect, the prismatic sealed secondary battery of the present invention achieves high quality in appearance.

In the prismatic sealed secondary battery of the present invention, the depressions are formed largely owing to heat strain signatures. Therefore, unlike the case of Japanese Laid-Open Patent Application Publication No. 2001-57179, there is no need to form depressions on the case prior to placing the electrode assembly therein, and the battery of the present invention ensures a high battery capacity.

As a result, the prismatic sealed secondary battery of the present invention is capable of ensuring a high battery capacity and suppressing the case swelling, and achieves high quality in appearance at low cost.

In the above prismatic sealed secondary battery of the present invention, it is desirable that the linear portion composed of the recrystallized structure has been heated at the temperature no lower than the recrystallization temperature but below the melting point of the material of the case.

In the above prismatic sealed secondary battery of the present invention, it is desirable to form depressions in a manner that meets the following conditions. When the direction from the sealed open end toward the closed end is the first direction, and a direction perpendicular to the first direction is the second direction, the main plane has a height in the first direction and a width in the second direction when viewed in a plan. The depressions are formed in a manner that, on the main plane, a surface area ratio of the depressions within a predetermined area becomes higher than a surface area ratio of the depressions outside the predetermined area. The predetermined area is a region where a first swath intersects a second swath. The first swath stretches over the main plane in the second direction, and begins from 10% of the height from the joined edge and ends at 40%. The second swath stretches over the main plane in the first direction and occupies 40% of the width in a middle of the main plane in the first direction.

In the above prismatic sealed secondary battery of the present invention, it is desirable that the heat strain signatures be created in the shape of one of a straight line, a cross, and a swirl, when the main plane is viewed in a plan.

A method for manufacturing a prismatic sealed secondary battery of the present invention is characterized by including the following steps:

(a) placing an electrode assembly in a prismatic tubular case having four lateral planes, one open end, and one closed end, the four lateral planes being composed of two main planes and two secondary planes, the main planes being laid along a direction intersecting thickness of the positive electrode or the negative electrode;

(b) joining a sealing cap with the open end to seal the case which houses the electrode assembly therein; and (c) on at least one of the main planes of the sealed case, irradiating an energy beam with scanning irradiation spots and thereby creating one or more linear heat strain signatures, and forming one or more depressions surrounding the linear heat strain signatures, with the heat strain signatures being a principal cause of the depressions, the energy beam being controlled so that a maximum temperature of irradiated area is within a range no lower than a recrystallization temperature but below a melting point of a material of the case.

In the step (c) of the method for manufacturing the prismatic sealed secondary battery of the present invention, the energy beam for irradiation is controlled so that the maximum temperature of the irradiated area (on the case surface of the side irradiated by a beam) is within the range no lower than the recrystallization temperature but below the melting point of the material of the case, when the energy beam is irradiated on the main plane of the case as the irradiation spots are being scanned. Herewith, one or more linear heat strain signatures are created, and one or more depressions are formed along the heat strain signatures. Consequently, unlike the case in the conventional technology described above, the method for manufacturing the prismatic sealed secondary battery of the present invention is capable of forming the depressions effective in suppressing the case swelling without creating multiple-line laser irradiation signatures.

The method for manufacturing the prismatic sealed secondary battery of the present invention is capable of forming the depressions having slopes with a gentle rise, and thereby producing a prismatic sealed secondary battery having high quality in appearance.

The method for manufacturing the prismatic sealed secondary battery of the present invention forms the depressions largely owing to the heat strain signatures. Therefore, unlike Japanese Laid-Open Patent Application Publication No. 2001-57179, there is no need to form depressions on the case prior to placing the electrode assembly therein, and the method of the present invention is capable of manufacturing prismatic sealed secondary batteries having a high battery capacity.

As a result, the manufacturing method of the present invention is capable of manufacturing prismatic sealed secondary batteries which ensure a high battery capacity, suppress the case swelling, and achieve high quality in appearance at low cost.

In the step (c) of the above method for manufacturing the prismatic sealed secondary battery of the present invention, it is desirable that the spot diameter of the energy beam formed on the main plane be set in the range of 2.0 mm and 6.0 mm inclusive.

In the above method for manufacturing the prismatic sealed secondary battery of the present invention, it is desirable to form depressions in a manner that meets the following conditions. When the direction from the sealed open end toward the closed end is the first direction, and a direction perpendicular to the first direction is the second direction, the main plane has a height in the first direction and a width in the second direction when viewed in a plan. In the step (c), the depressions are formed in a manner that, on the main plane, a surface area ratio of the depressions within a predetermined area becomes higher than a surface area ratio of the depressions outside the predetermined area. The predetermined area is a region where a first swath intersects a second swath. The first swath stretches over the main plane in the second direction, and begins from 10% of the height from the joined edge and ends at 40%. The second swath stretches over the main plane in the first direction and occupies 40% of the width in a middle of the main plane in the first direction.

In the step (c) of the above method for manufacturing the prismatic sealed secondary battery of the present invention, it is desirable to scan the irradiation spots of the energy beam on the main plane in a manner that the heat strain signatures are created in the shape of one of a straight line, a cross, and a swirl.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawing:

FIG. 1 is an external perspective view showing a prismatic lithium ion battery 1 according to a first embodiment of the present invention;

FIGS. 5A-5D are process drawings showing a process of forming depressions 103 and 104 by a laser forming process, where FIG. 5A is a partial cross section showing the case 10 before a laser beam is irradiated thereto, FIG. 5B is a partial cross section showing the case 10 in a state of being heated immediately after the laser beam irradiation has started, FIG. 5C is a partial cross section showing the case 10 in which a recrystallized portion 101b has been formed, and FIG. 5D is a partial cross section showing the case 10 after the laser beam irradiation has finished;

FIG. 6A is a perspective view of the case 80 prior to the increased internal pressure, FIG. 6B is a perspective view of the case 80 swollen owing to the increased internal pressure, and FIG. 6C is a side view of FIG. 6B.

FIGS. 7A-7C are front elevational views of prismatic lithium ion batteries used in confirmatory experiments, where FIG. 7A illustrates a prismatic lithium ion battery of a working example, FIG. 7B illustrates a prismatic lithium ion battery of a comparative example I, and FIG. 7C illustrates a prismatic lithium ion battery of a comparative example II;

FIGS. 8A-8C are front elevational views of prismatic sealed secondary batteries, where FIG. 8A illustrates a prismatic sealed secondary battery 2 of a second embodiment of the present invention, FIG. 8B illustrates a prismatic sealed secondary battery 3 of a third embodiment, and FIG. 8C illustrates a prismatic sealed secondary battery 4 of a fourth embodiment; and FIGS. 9A-9B are front elevational views of prismatic sealed secondary batteries, where FIG. 9A illustrates a prismatic sealed secondary battery 5 of a fifth embodiment of the present invention, and FIG. 9B illustrates a prismatic sealed secondary battery 6 of a sixth embodiment.

DESCRIPTION OF PREFERRED EMBODIMENTS

1. First Embodiment

The following describes the first embodiment of the present invention taking a prismatic lithium ion battery 1 as an example. The prismatic lithium ion battery 1 according to this embodiment represents merely one example of the present invention, and therefore the present invention is not confined to this embodiment.

1.1 Structure of Prismatic Lithium Ion Battery 1

The structure of the prismatic lithium ion battery (hereinafter, simply "prismatic battery") 1 according to this embodiment is explained with the aid of FIGS. 1 and 2. FIG. 1 is an external perspective view of the prismatic battery 1, and FIG. 2 is a cross section of the prismatic battery 1 of FIG. 1 along the line A-A.

As shown in FIG. 1, the prismatic battery 1 includes a prismatic case 10, and has an external structure where a sealing cap 11 is joined with an open end of the case 10 located in the Z-axis direction. The case 10 is made of, for example, an Al—Mn alloy (Japanese Industrial Standards: 3000-series aluminum alloy).

The sealing cap 11 is joined with the case 10 by welding (e.g. laser welding), and an external contact terminal 110 is provided in the midsection of the main plane of the sealing cap 11. On the lateral plane of the external contact terminal 110, a gas exhaust vent 110H for exhausting gases generated inside of the case 10 is provided.

Figure 2:
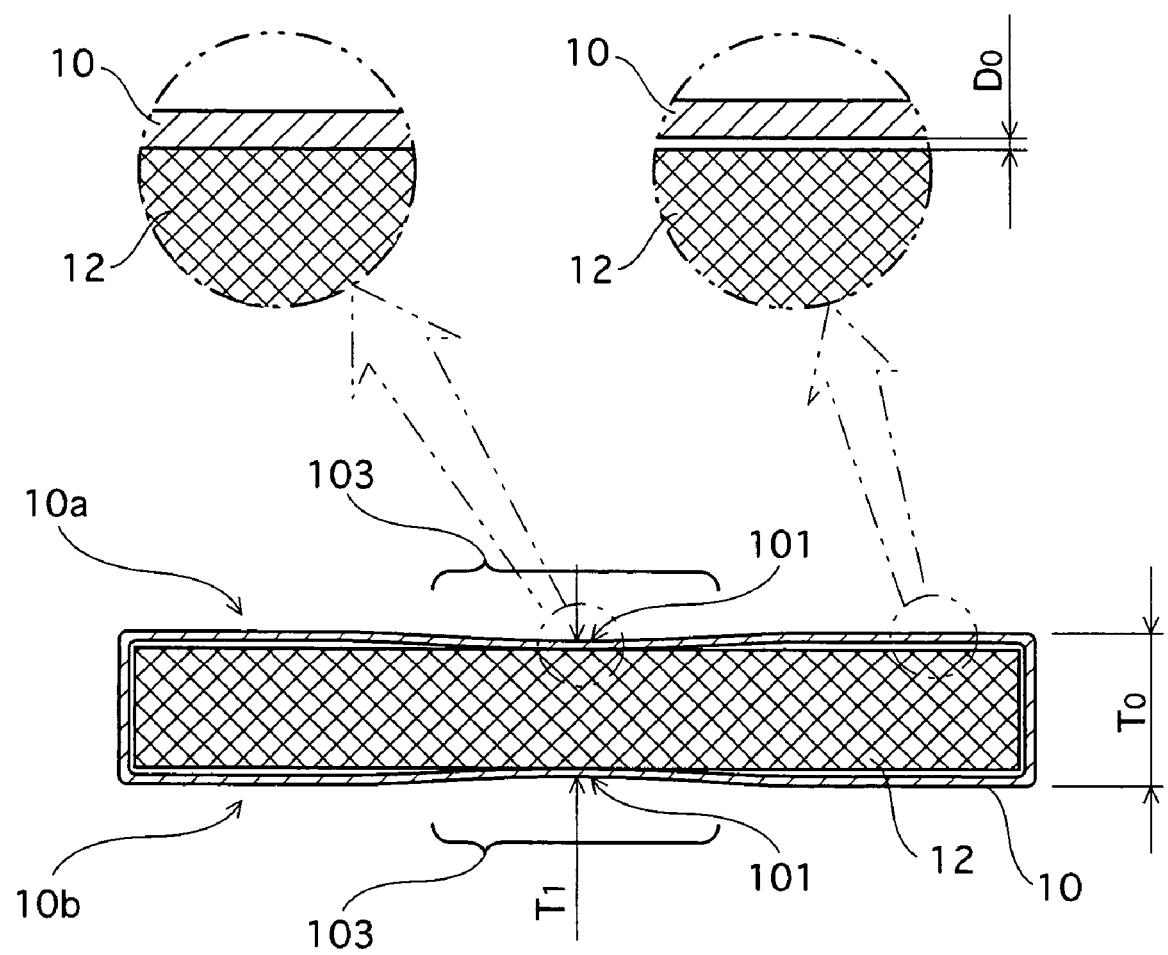
FIG. 2 is a cross section of the prismatic lithium ion battery 1 along the line A-A.

As shown in FIG. 2, in the internal space formed by joining the sealing cap 11 with the case 10, an electrode assembly 12 is housed. The electrode assembly 12 is formed by spirally winding a separator (not shown) sandwiched between a positive electrode (not shown) and a negative electrode (not shown), where the positive and negative electrodes are placed opposite from one another. The electrode assembly 12 housed in the internal space is impregnated with a nonaqueous electrolyte solution.

Referring now back to FIG. 1, on a main plane 10a of the case 10 of the prismatic battery 1, two linear laser irradiation signatures 101 and 102 are created which intersect each other within an area 100. Each of these two linear laser irradiation signatures 101 and 102 is striated, and the laser irradiation signature 101 is provided in the Z-axis direction while the laser irradiation signature 102 is in the Y-axis direction. The area 100 where the laser irradiation signatures 101 and 102 intersect is set at the position slightly off, in the Z-direction, the midsection of the main plane 10a toward where the sealing cap 11 is joined. The setting of the area 100 will be described later.

As shown in FIG. 1, on the main plane 10a of the case 10, depressions 103 and 104 which dent inwards are formed along the laser irradiation signatures 101 and 102, with the laser irradiation signatures 101 and 102 being a principal cause of these depressions 103 and 104. Namely, on the main plane 10a of the case 10, the laser irradiation signatures 101 and 102 are arranged in the shape of a cross, and the depressions 103 and 104 are formed centering along these laser irradiation signatures 101 and 102. Here, the surface distribution of the depressions 103 and 104 on the main plane 10a of the case 10 is set in a manner that the surface area ratio of the depressions 103 and 104 within the area 100 (a ratio of the surface area of the depressions 103 and 104 to the total surface area of the area 100) is higher than the surface area ratio of the depressions 103 and 104 outside the area 100 on the main plane 10a.

In FIG. 1, for the sake of convenience, the laser irradiation signatures 101 and 102 are illustrated with clear-cut outlines. However, these signatures 101 and 102 do not really have such distinct outlines as shown in the figure. That is, unless a detailed observation is conducted, it is difficult to detect outlines of the laser irradiation signatures 101 and 102 in the prismatic battery 1, and only the formation of the depressions 103 and 104 can be detected. These depressions 103 and 104 have slopes with a gradual rise.

On the A-A cross section of the prismatic battery 1 as shown in FIG. 2, a part of the interior surface of the case 10 where the depression 103 is formed is in contact with the exterior surface of the electrode assembly 12. More specifically, as shown in the two magnified figures of FIG. 2, there is an interspace $D_0$ between the interior surface of the case 10 and the exterior surface of the electrode assembly 12 in the section where the depression 103 is not formed. On the other hand, in the section where the depression 103 is formed, there is a narrower interspace between the interior surface of the case 10 and the exterior surface of the electrode assembly 12, or these two are in contact as described above. Note that the section where the depression 104 is formed centering around the laser irradiation signature 102 has the same structure.

On the main plane 10b on the back of the prismatic battery 1, the depressions 103 and 104 largely owing to the laser irradiation signatures 101 and 102 are created as in the same manner as the main plane 10a. Note that, in FIG. 2, only the laser irradiation signature 101 and the depression 103 are shown for convenience of illustration.

In the case 10 of the prismatic battery 1, the battery thickness between the midsections of the depressions 103 and 104 each on the main planes 10a and 10b, respectively, is $T_1$. That is, in the prismatic battery 1, the battery thickness between the midsections of the depressions 103 and 104, $T_1$, is set smaller than the battery thickness elsewhere $T_0$.

1.2 Configuration of Depressions 103 and 104

Figure 3:
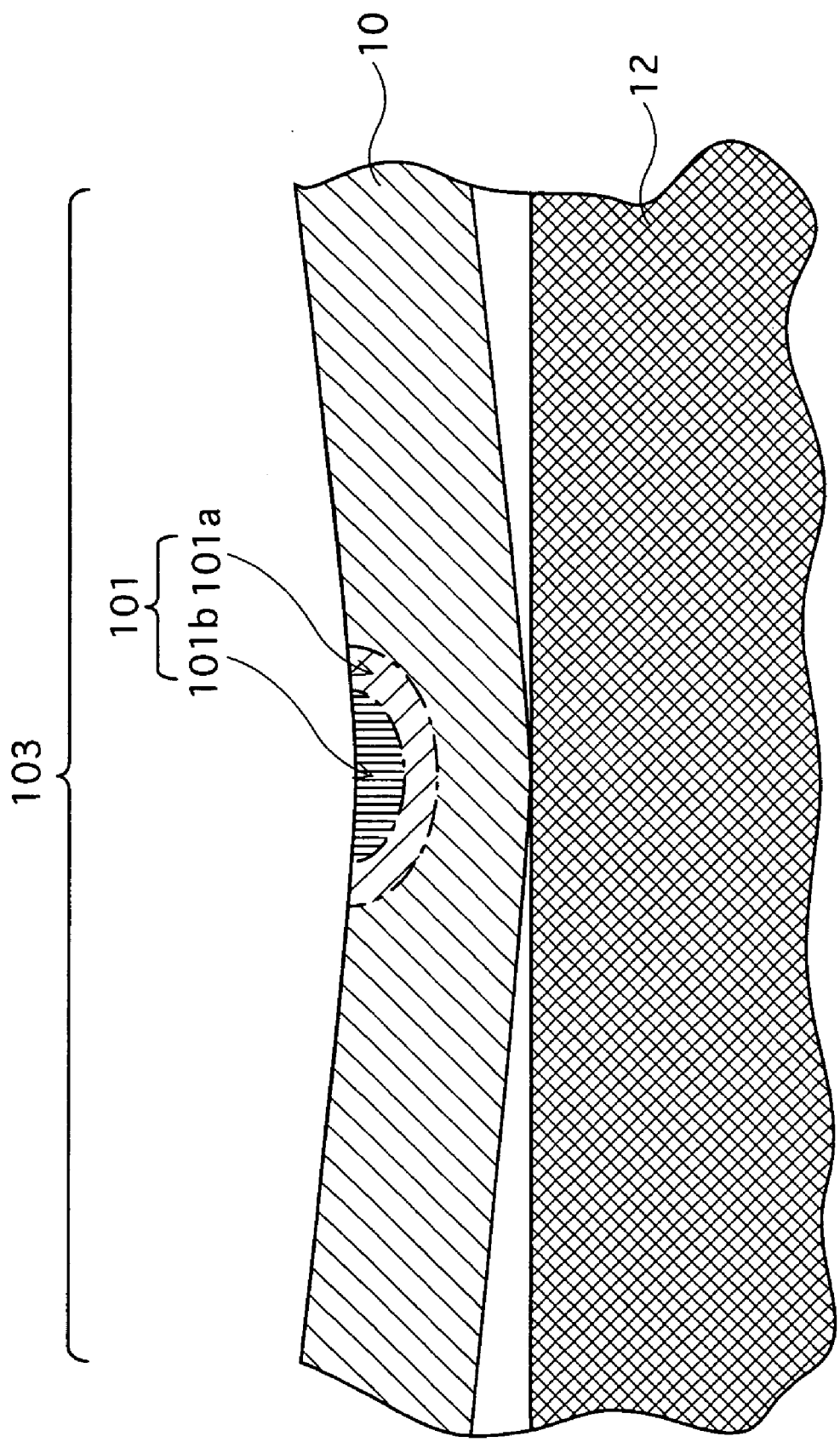
FIG. 3 is a cross section of a laser irradiation signature 101 on a case 10 in the thickness direction.

The configuration of the depressions 103 and 104 formed as described above is explained with the aid of FIG. 3. FIG. 3 is a magnified cross section of FIG. 2 of the midsection where the depression 103 is formed. Note that only the depression 103 is illustrated in FIG. 3, however the depression 104 has the same configuration as the depression 103.

As shown in FIG. 3, the case 10 is dented inward to the battery due to the formation of the laser irradiation signature 101, and the interior surface of the case 10 and the exterior surface of the electrode assembly 12 are in contact at which the laser irradiation signature 101 is created. In terms of metallic composition, the laser irradiation signature 101 is made up of a heat-influenced portion 101a and a recrystallized portion 101b. More specifically, the laser irradiation signature 101 on the outer surface of the case 10 comprises: the recrystallized portion 101b which is, on cross section, fanned out inwardly the plate of the case 10 from the center of the linewidth of the laser irradiation signature 101, and composed of a recrystallized structure; and the heat-influenced portion 101a radially surrounding and adjoining the outside of the bulbous part of the recrystallized portion 101b. Here, the recrystallized portion 101b is a portion subjected to heating by the laser beam irradiation when the depression 103 is being formed. The heating temperature applied is set within the range no lower than the recrystallization temperature but below the melting point of the Al—Mn alloy of the case 10. The heat-influenced portion 101a is a portion subjected to the heat temperature below the recrystallization temperature. The manufacturing method including these setting parameters will be described later.

Note that the laser irradiation signatures 101 and 102 on the other main plane 10b of the case 10 have portions composed of the recrystallized structure, the same as found in the laser irradiation signatures 101 and 102 on the main plane 10a.

1.3 Formation Method of Depressions 103 and 104

Figure 4:
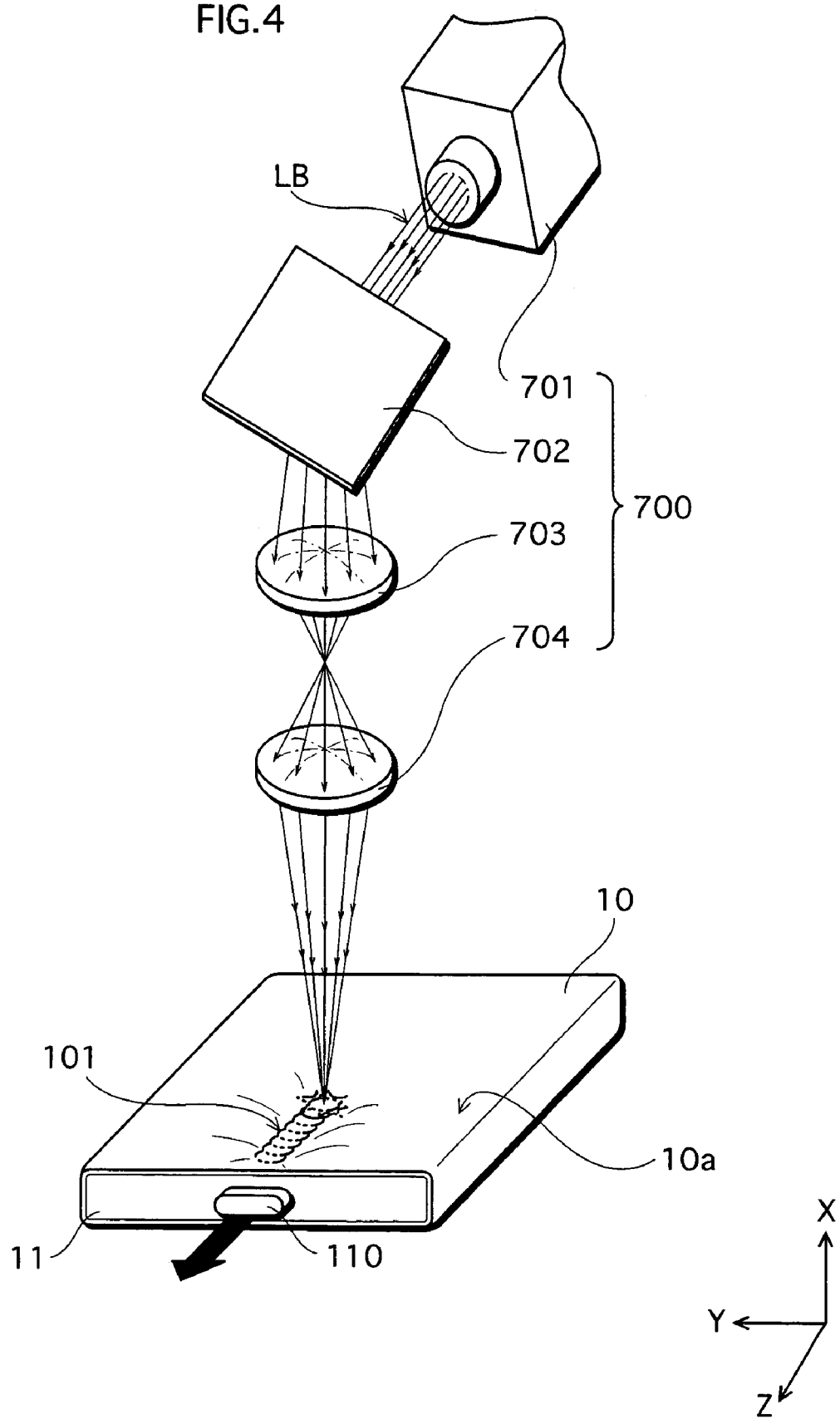
FIG. 4 is a schematic diagram showing a laser forming apparatus 700 used for forming depressions 103 and 104 on the case 10.

The method for forming the depressions 103 and 104 on the case 10 of the prismatic battery 1 is explained with the aid of FIGS. 4 and 5. Note that the formation method of only the depression 103 is shown in FIGS. 4 and 5, however the depression 104 can be formed by the same method.

As shown in FIG. 4, for forming the depression 103, the prismatic battery is placed on the manufacturing base (not shown) corresponding to the Y-Z plane so that the main plane 10a faces upward in the X-axis direction. Here, in the case 10 of the prismatic battery, the electrode assembly 12 (not shown in FIG. 4) is already housed, and the open end of the case 10 is sealed by the sealing cap 11 joined therewith in advance. Then, using a laser forming apparatus (hereinafter, "LF apparatus") 700, a laser beam LB is irradiated on the main plane 10a and the laser irradiation signature 101 is created. The structure of the LF apparatus 700 is as follows.

As shown in FIG. 4, the LF apparatus 700 comprises: a YAG laser welding machine 701; a mirror 702; and lenses 703 and 704. The YAG laser-welding machine 701 emits a laser beam LB in the pulse oscillation mode. The mirror 702 deflects the emitted laser beam LB to a direction perpendicular to the main plane 10a. The lenses 703 and 704 converge the deflected laser beam LB to a given spot diameter.

The irradiation parameters are set as follows when, for example, the case 10 is made of a 3000-series aluminum alloy and the plate thickness of the main plane 10a is 0.3 mm.

<Irradiation Parameters>
  Laser Output: 156 J/pulse
  Pulse Frequency: 20 pulses/s
  Pulse Propagation Speed: 12 mm/s
  Spot Diameter: (theoretical value) 4.0-4.3 mm Note that these irradiation parameters provided above are merely illustrative, and they shall be modified depending on the plate material used for the case 10, the plate thickness, the predetermined manufacturing Takt time (i.e. the predetermined time between units of production output) and so on.

Using the above laser irradiation parameters, the depression 103 is formed as shown in FIG. 3 by creating the laser irradiation signature 101 on the main plane 10a of the case 10. The mechanism of this formation is explained with the aid of FIGS. 5A-5D.

On the case 10 shown in FIG. 5A, the laser beam LB with the above parameters is irradiated from the main plane side as shown in FIG. 5B. Subsequently, the peripheral area centering around the irradiated spots is heated up. At this point, the case 10 causes elastic deformation in the direction of the arrows F1 due to thermal expansion of the heated area in the case 10.

As shown in FIG. 5C, when the heated area of the case 10 subjected to irradiation of the laser beam LB reaches the recrystallization temperature or higher, the amount of the elastic deformation decreases as indicated with the dashed arrows F2 owing to a reduction in yield stress. At this point, recrystallization occurs in the area radially extended from the irradiation point of the laser beam LB.

As shown in FIG. 5D, after the irradiation by the laser beam LB is finished, the heated area is cooled off and thereby the case 10 causes thermal contraction as indicated with the arrows F3. Consequently, the depression 103 is formed on the case 10. After the cooling off of the heated area, the laser irradiation signature 101 is made up of the heat-influenced portion 101a subjected to heating below the recrystallization temperature and the recrystallized portion 101b subjected to heating no lower than the recrystallization temperature but below the melting point. In the manufacturing according to the above parameters, the maximum temperature for the heating is controlled to below the melting point. Therefore, the area subjected to the heating does not melt even while being heated. As a result, not a recoagulated portion composed of a recoagulated structure but the recrystallized portion 101b composed of the recrystallized structure is formed after the cooling off.

Table 1 shows recrystallization temperatures and melting points of various metals. Table 2 shows irradiation parameters examined by the present inventors for each plate thickness of the case 10 as well as for each pulse propagation speed used when the depression 103 was formed.

TABLE 1

|  | Recrystallization Temperature (° C.) | Melting Point (° C.) |
|---|---|---|
| Aluminum (Al) | 150-200 | 660 |
| Iron (Fe) | 350-500 | 1535 |
| Copper (Cu) | 200-250 | 1083 |
| Nickel (Ni) | 530-660 | 1453 |

Note that the values of the recrystallization temperatures and melting points shown in Table 1 above will be changed when the metals are alloyed by other elements.

TABLE 2

| Plate Thickness of Case 10 (mm) | Pulse Propagation Speed (mm/s) | Laser Output (J/pulse) | Pulse Frequency (pulses/s) |
|---|---|---|---|
| 0.30 | 12.0 | 156 | 20 |
| 0.25 |  | 128 | 20 |
| 0.20 |  | 105 | 20 |
| 0.30 | 18.0 | 220 | 30 |
| 0.25 |  | 188 | 30 |
| 0.20 |  | 151 | 30 |

By employing the above-mentioned method and irradiation parameters, the depressions 103 and 104 as shown in FIGS. 1-3 can be formed. The recrystallized portions 101b and 102b (FIGS. 3 and 5 showing only the recrystallized portion 101b) each in the laser irradiation signatures 101 and 102, respectively, can be examined with the following method.

When a laser beam is irradiated on the main plane 10a and the irradiated part is heated at or above the recrystallization temperature, the metal structure, having been disturbed by the drawing and like when the case was formed, is recrystallized, and refined crystal grains are formed. In order to examine this recrystallized portion, a cut plane of the portion is ground to achieve a mirrored surface and then etched. Then, the processed surface of the recrystallized portion can be examined under the microscope (at a magnification of approximately 500 times).

1.4 Setting for Area 100

Figure 6A:
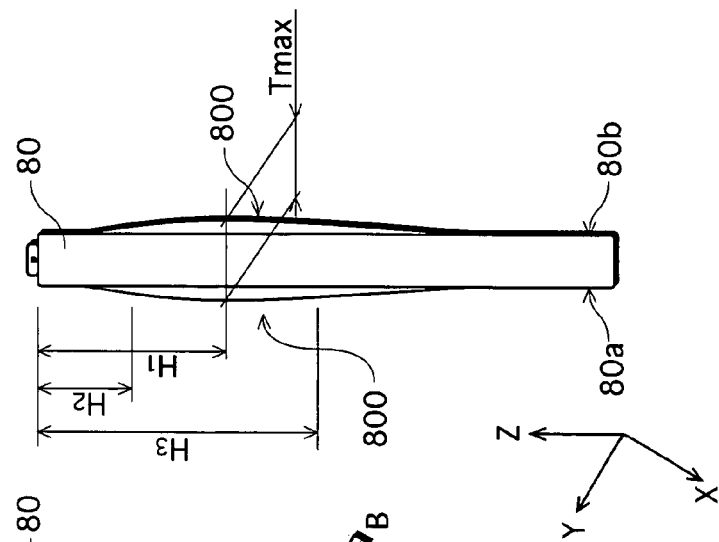
FIGS. 6A-6C are appearance diagrams of the case 80, which is a conventional prismatic sealed secondary battery having no depressions, related to the case swelling owing to an increased internal pressure, where
Figure 6B:
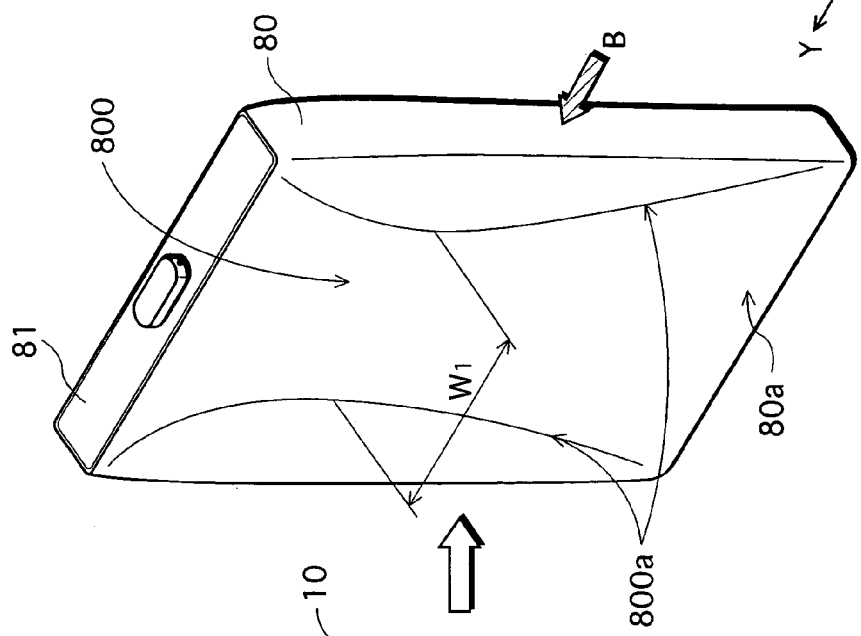
Figure 6C:
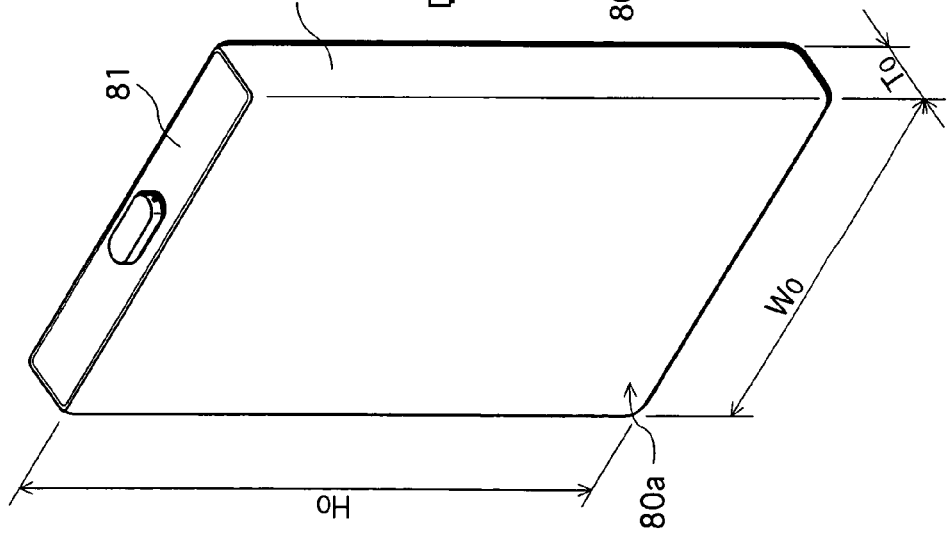

With the aid of FIGS. 6A-6C, the following gives an account of how to set the area 100 of FIG. 1 above. FIGS. 6A-6C are appearance diagrams related to the swelling of the main plane 80a developed as the internal pressure of a conventional prismatic battery that has a case 80 with no depressions is increased.

As shown in FIG. 6A, prior to the internal pressure being increased, the case 80 is a prismatic tubular case having a bottom with the dimensions of height $H_0$, width $W_0$, and thickness $T_0$. The open end of the case 80 located on the upper side in the Z-axis direction is sealed by the sealing cap 81 joined therewith. As the internal pressure of such a prismatic battery is increased, a swelling 800 occurs with two ridgelines 800a on the main plane 80a of the case 80 as shown in FIG. 6B.

When the prismatic battery of FIG. 6B is viewed from the arrow B, the swelling 800 appears in the case 80 as shown in FIG. 6C, and the thickness of the prismatic battery reaches the maximum thickness $T_{max}$. At this point, the place at which the maximum thickness $T_{max}$ appears is adjacent to where the distance between the ridgelines 800a shown in FIG. 6B becomes shortest, a width $W_1$.

As shown in FIG. 6C, within the case 80, the maximum thickness $T_{max}$ appears at a place located a length $H_1$ downward in the Z-axis direction from the joined edge of the sealing cap 81. The length $H_1$ varies depending on the plate thickness of the case 80 and other factors, but in general the length $H_1$ takes a value of around 25% of the height $H_0$ of the case 80.

In view of the swelling of the case 80 as described above, in the prismatic battery 1 according to the present embodiment, the area 100 shall be set as follows.

The area 100, on the main plane of the case 10 in the prismatic battery 1 according to the present embodiment, has its height in the height direction of the case 10 (i.e. the Z-axis direction). It is desirable that, when the case 10 has the height $H_0$, the height of the area 100 be set in the manner that the area 100 occupies the range between $H_2/H_0=10\%$ and $H_3/H_0=40\%$ in the height direction.

As to the width of the area 100, the width $W_1$ between the ridgelines 800a shown in FIG. 6B is taken into account, where $W_1=0.4\ W_0$. Herewith, it is desirable that the width of the area 100 be set in a manner that the area 100 occupies 20% of the width $W_0$ both directions away from the center axis of the case 10 in the width direction of the case 10 (i.e. the Y-axis direction).

1.5 Advantages in Prismatic Battery 1 of First Embodiment and in Method for Manufacturing the Same As described above, the prismatic battery 1 according to the first embodiment has the laser irradiation signatures 101 and 102 arranged in the shape of a cross. The laser irradiation signatures 101 and 102 are created on both main planes 10a and 10b of the case 10. Largely owing to these laser irradiation signatures 101 and 102, the depressions 103 and 104 are formed. The laser irradiation signatures 101 and 102 are set so as to have their intersection in the area 100 where a swelling most likely appears. The case 10 with such depressions 103 and 104 formed on the main planes 10a and 10b excels in strength against the swelling, compared to the case having no depressions. Namely, the depressions 103 and 104 formed on the main planes 10a and 10b function as reinforcement beams. Because of this function, the swelling of the case 10 is suppressed when the prismatic battery 1 is being charged, has gone through several charge-discharge cycles, or has been left in an elevated temperature environment.

In addition, according to the present embodiment, the spot diameter of the laser beam is set large, 4.0-4.3 mm, when the depressions 103 and 104 are formed. The depressions 103 and 104 are formed with the energy density at which the recrystallized portion 101b is formed on the external surface of the case 10 within the laser irradiation signatures 101 and 102. Thereby, the depressions 103 and 104, which are effective in suppressing the swelling of the case 10, can be formed simply by single-line laser irradiation signatures 101 and 102. As a result, the Takt time involved for the formation of the depressions 103 and 104 can be set short.

In the manufacturing method of the prismatic battery 1 according to the present embodiment, first the electrode assembly 12 is housed in the case 10, and the sealing cap 11 is joined with the case 10. Then, the depressions 103 and 104 are formed. Consequently, this manufacturing method achieves the energy-efficient prismatic battery 1 without sacrificing the capacity of the electrode assembly for forming the depressions, unlike the case of the prismatic battery according to the above-mentioned technology disclosed in Japanese Laid-Open Patent Application Publication No. 2001-57179.

Furthermore, the method for forming the depressions 103 and 104 according to the present embodiment allows the slopes of the depressions 103 and 104 to be gradual (i.e. small dip angles). Therefore, it is less likely to include air in the depressions 103 and 104 when film is wrapped and adhered to the outer surface of the case 10. As a result, the prismatic battery 1 according to the present embodiment achieves high quality in appearance.

Hence, the prismatic battery 1 is capable of ensuring a high battery capacity and suppressing the case swelling, and achieves high quality in appearance at low cost.

1.6 Confirmatory Experiments

The following describes experiments conducted in order to check the advantages of the prismatic battery 1 according to the first embodiment.

Each of the prismatic batteries used in the experiments has the following dimensions and is made of the following material.

Outside Dimensions of the Case: Thickness 4.9 mm×Width 33.7 mm×Height 49.5 mm

Height of the Case: 48.0 mm

Plate Thickness of the Case: Main plane 0.3 mm; Lateral plane 0.35 mm

Material of the Case: 3000-series aluminum alloy

Inside Dimensions of the Case: Thickness 4.3 mm×Width 33.0 mm

Outside Dimensions of the Electrode assembly: Thickness 4.2 mm×Width 32.3 mm

The following explains battery samples according to a working example, and comparative examples I and II with the aid of FIGS. 7A-7C and Table 3.

|  | Working Example | Comparative Example I |
|---|---|---|
| Laser Output (J/pulse) | 156 | 45 |
| Pulse Frequency (pulses/s) | 20 | 35 |
| Pulse Propagation Speed (mm/s) | 12.0 | 12.0 |
| Spot Diameter (mm) | (theoretical value) 4.0-4.3 | 0.6-0.7 |
| Manufacturing Total Length (mm) | 64.0 | 192.0 |
| Manufacturing Takt Time (s) | 16.0 | 60.0 |

1.6.1 Working Example

The prismatic battery according to the working example had laser irradiation signatures 1011 and 1012 on a main plane 1010a as shown in FIG. 7A, and thereby depressions (not shown) were formed on the main plane 1010a. The laser signatures 1011 and 1012 were the same as those created in the prismatic battery 1 of the first embodiment above, and took the following dimensional relationship.

| | |
|---|---|
| $H_4$: | 40 mm |
| $H_5$: | 3 mm |
| $H_6$: | 12 mm |
| $W_2$: | 24 mm |

The laser beam irradiation parameters used for forming depressions are shown in Table 3. When the depressions were formed using the irradiation parameters of this working example, the laser irradiation signatures 1011 and 1012 were made up of both a recrystallized portion and a heat-influenced portion as is the case in the above first embodiment.

1.6.2 Comparative Example I

As shown in FIG. 7B, the prismatic battery according to the comparative example I had two sets of three linear laser irradiation signatures 1021 and 1022 on a main plane 1020a, and thereby depressions (not shown) were formed. The dimensional relationship of these laser irradiation signatures 1021 and 1022 is shown below.

| | |
|---|---|
| $H_7$: | 40 mm |
| $H_8$: | 3 mm |
| $H_9$: | 12 mm |
| $W_3$: | 24 mm |

As to the prismatic battery according to the comparative example I shown in FIG. 7B, the laser beam irradiation parameters shown in Table 3 were used for forming depressions on a main plane 1020a. In the laser irradiation signatures 1021 and 1022 created using these irradiation parameters, portions composed of a recoagulated structure centering around the irradiated spots on the external surface of the main plane 1020a were formed. Namely, when the laser beam irradiation parameters of the comparative example I shown in Table 3 were used, the area radially extended to a given distance centering around the laser beam irradiation spots was heated up until the temperature of the area exceeded the melting point. Subsequently, the heated area was cooled off, and herewith the recoagulated portion was formed.

Note that the reason why the laser beam irradiation for creating the laser irradiation signatures 1021 and 1022 was implemented with sets of three lines is that the spot diameter of the irradiation parameter was 0.6-0.7 mm, which is very small compared to that of the working example. By creating single-line laser irradiation signatures, perfect depressions cannot be formed.

1.6.3 Comparative Example II

As to the prismatic battery according to the comparative example II, depressions were not formed on a main plane 1030a as shown in FIG. 7C.

Five each of the prismatic batteries according to the working example and the comparative examples I and II, respectively, were prepared and the following experiments were conducted.

1.6.4 Experiment I

Each of the batteries according to the above working example and comparative examples I and II was charged until the battery reached a full charge. In this situation, the thickness of the battery was measured at the following points: discharged; 30% charged; 50% charged; and full charged. The results of the measurements are shown in Table 4.

TABLE 4

| | | Discharged | 30% | 50% | Full |
|---|---|---|---|---|---|
| Working | Ave. | 4.954 | 4.982 | 5.010 | 5.178 |
| Example | Range | 4.95-4.97 | 4.97-4.99 | 5.00-5.02 | 5.15-5.20 |
| Comparative | Ave. | 4.952 | 4.984 | 5.008 | 5.176 |
| Example I | Range | 4.95-4.96 | 4.98-5.00 | 5.00-5.03 | 5.15-5.21 |
| Comparative | Ave. | 4.956 | 4.996 | 5.028 | 5.216 |
| Example II | Range | 4.95-4.96 | 4.97-5.02 | 5.00-5.06 | 5.18-5.25 |

As shown in Table 4, as with the prismatic batteries of the comparative example II in which depressions were not formed on the main plane 1030a, the average thickness of the batteries changed from 4.956 mm (discharged) to 5.216 mm (full charged). Namely, the cases of the prismatic batteries of the comparative example II swelled 0.260 mm on an average owing to charging. On the other hand, as with the prismatic batteries of the working example as well as those of the comparative example I, their average swelling was suppressed, 0.224 mm. That is, the prismatic batteries of the working example and the comparative example I achieved a 14% suppression in the case swelling by forming depressions on the cases.

1.6.5 Experiment II

In this experiment, each of the batteries according to the above working example and comparative examples I and II was stored in a high temperature environment of 85° C. for three hours. In this situation, the thickness of the battery was measured at the following points: before stored; immediately after taken out from the above environment; and after cooled off. The results of the measurements are shown in Table 5.

TABLE 5

| | | | | Unit: (mm) |
|---|---|---|---|---|
| | | Before Stored | Taken Out | After Cooled |
| Working | Ave. | 5.178 | 6.030 | 5.456 |
| Example | Range | 5.15-5.20 | 5.99-6.14 | 5.43-5.49 |
| Comparative | Ave. | 5.176 | 6.072 | 5.486 |
| Example I | Range | 5.15-5.21 | 6.02-6.12 | 5.45-5.54 |
| Comparative | Ave. | 5.216 | 6.314 | 5.618 |
| Example II | Range | 5.18-5.25 | 6.27-6.34 | 5.57-5.65 |

As shown in Table 5, as with the prismatic batteries of the comparative example II, the average difference in the battery thicknesses between "before stored" and "immediately after the batteries were taken out" was 1.098 mm. On the other hand, as with the prismatic batteries of the comparative example I and those of the working example, their average differences were 0.896 mm and 0.852 mm, respectively. The results show that the prismatic batteries of the working example exhibited the smallest swelling in the cases when left in the elevated temperature environment, and the swelling was suppressed by approximately 23% when compared to the prismatic batteries of the comparative example II.

By cooling off the batteries taken out from the above environment, the swelling of each battery became reduced. Nonetheless, all prismatic batteries here remained swollen as compared to before they were stored in the above environment: the prismatic batteries of the comparative example II remained swollen by 0.402 mm, of the comparative example I by 0.310 mm, and of the working example by 0.278 mm. Thus, again the prismatic batteries of the working example exhibited the least swelling remained after the cooling off, and the remaining swelling was reduced by 31% when compared to the prismatic batteries of the comparative example II.

1.6.6 Discussion

The results of the above two experiments show that, among the prismatic batteries of the working example and comparative examples I and II, the case swelling was suppressed most in the prismatic batteries of the working example in both cases in which the batteries were being recharged and were left in the elevated temperature environment. What this tells us is that the depressions formed on the case of the prismatic batteries of the working example function as reinforcement beams on the main planes of the case, and contribute to suppressing the case swelling.

According to the results of the experiment I above, it can be observed that the case swelling was suppressed in the prismatic batteries of the comparative example I, as with the prismatic batteries of the working example. However, since portions composed of the recoagulated structure are formed within the respective laser irradiation signatures 1021 and 1022 as described above, very conspicuous signatures remain there. Furthermore, there is a problem that these signatures are likely to create dead-air spaces when film is wrapped and adhered to the case. Therefore, when comprehensively evaluated in consideration of quality in appearance, it can be said that the prismatic batteries of the working example excel those of the comparative examples I and II.

2. Second Embodiment

The following explains the prismatic sealed secondary battery 2 according to a second embodiment of the present invention with the aid of FIG. 8A.

As shown in FIG. 8A, the prismatic sealed secondary battery 2 according to the second embodiment has four linear laser irradiation signatures 201, 202, 203, and 204 created on a main plane of a case 20. These laser irradiation signatures 201-204 are also created so as to intersect each other within an area 200, as in the case of the prismatic battery 1 according to the first embodiment above. Each of the laser irradiation signatures 201-204 is made up of the recrystallized portion and the heat-influenced portion in the same manner shown in FIG. 3, and does not include a portion composed of the recoagulated structure. Namely, for creating the laser irradiation signatures 201-204, the laser beam is irradiated on the condition that the case surface temperature in the irradiated spots on the case 20 by the laser beam LB is within the range no lower than the recrystallization temperature but below the melting point.

Although not shown in the figure, depressions formed due to the laser irradiation signatures 201-204 above are established in a manner that the surface area ratio of the depressions within the area 200 becomes higher than the surface area ratio of the depressions outside the area 200 on the main plane of the case 20. The setting of this area 200 is the same in the case of the first embodiment above. Here, the height and the width of the main plane of the case 20 are $H_0$ and $W_0$, respectively. On the main plane, the area 200 is defined as a region delineated by $0.1H_0$ to $0.4H_0$ from the edge of the joined sealing cap and by $0.3W_0$ to $0.7W_0$ from the left edge (on the figure) of the case 10.

Note that on the other main plane of the case 20, opposite from the above main plane, the laser irradiation signatures and the depression formed thereby are also created in the same manner.

Thus, as in the case of the prismatic battery 1 of the first embodiment above, the swelling of the case 20 can be effectively suppressed in the prismatic sealed secondary battery 2 of the second embodiment. In addition, since the depressions are formed using the same method shown in FIG. 4 above, the prismatic sealed secondary battery 2 can reduce the work processes and also has advantages on the cost front.

3. Third Embodiment

The following explains a prismatic sealed secondary battery 3 according to a third embodiment with aid of FIG. 8B.

As shown in FIG. 8B, the prismatic sealed secondary battery 3 according to the third embodiment has four arc-shaped laser irradiation signatures 301-304 created on the main planes of the case 30. Also on the prismatic sealed secondary battery 3, depressions are formed due to these laser irradiation signatures 301-304. The prismatic battery having the depressions formed in such a configuration is less effective in suppressing the swelling of the case 30 as compared to the prismatic battery 1 of the first embodiment and the prismatic sealed secondary battery 2 of the second embodiment above. This is thought to be because the surface area ratio of the depressions within an area 300 is not set to be higher than the surface area ratio of the depressions outside the area 300. Nonetheless, the prismatic sealed secondary battery 3 has an effect on suppressing the swelling of the case 30 compared to a conventional prismatic sealed secondary battery having no depressions formed on the main planes of the case 30.

As in the case of the prismatic battery 1 of the first embodiment, the prismatic sealed secondary battery 3 of the third embodiment reduces the work processes during the manufacturing stage and also has advantages on the cost front.

4. Fourth Embodiment

The following explains a prismatic sealed secondary battery 4 according to a fourth embodiment with aid of FIG. 8C.

As shown in FIG. 8C, the prismatic sealed secondary battery 4 according to the fourth embodiment has three-stripe laser irradiation signatures 401-403 created in the longitudinal direction (i.e. the Z-axis direction of FIG. 8A) on the main planes of the case 40. Among the laser irradiation signatures 401-403 created in such a configuration, the laser irradiation signature 401 located in the middle runs longitudinally through an area 400, and is effective in suppressing the swelling of the case 40 of the prismatic sealed secondary battery 4. Again, each of the laser irradiation signatures 401-403 of the fourth embodiment is made up of the recrystallized portion and heat-influenced portion formed inward to the case plate. In addition, the spot diameter for the laser beam irradiation is set large. Herewith, the manufacturing processes required for the formation of the depressions can be reduced.

5. Fifth Embodiment

The following explains a prismatic sealed secondary battery 5 according to a fifth embodiment with aid of FIG. 9A.

As shown in FIG. 9A, the prismatic sealed secondary battery 5 of the fifth embodiment has a single linear laser irradiation signature 501 created in the height direction (i.e. the Z-axis direction of FIG. 9A) of the case 50, and a depression (not shown in FIG. 9A) is formed along the laser irradiation signature 501 that is a principal cause of the formation of the depression. Again, in this case, the prismatic sealed secondary battery 5 of the fifth embodiment has the same effects as the prismatic sealed secondary battery 4 of the fourth embodiment and so on.

6. Sixth Embodiment

The following explains a prismatic sealed secondary battery 6 according to a sixth embodiment with aid of FIG. 9B.

As shown in FIG. 9B, the prismatic sealed secondary battery 6 of the sixth embodiment has a swirling laser irradiation signature 601 with its center set in an area 600 on each main plane of the case 60. In the prismatic sealed secondary battery 6, the laser irradiation signature 601 is intensively created over the area 600, and herewith a depression (not shown in FIG. 9B) is formed. Consequently, the swelling of the case 60 can be suppressed highly efficiently. Again in this case, the laser irradiation signature 601 is made up of the recrystallized portion and heat-influenced portion formed inward to the case plate.

Hence, in the prismatic sealed secondary battery 6 of the sixth embodiment, the swelling of the case 60 is effectively suppressed and the work processes required for the formation of the depressions can be reduced.

Note that the first to sixth embodiments described above are merely examples, and the present invention may be a prismatic sealed secondary battery having one or more depressions formed by one or more laser irradiation signatures of a different configuration.

7. Additional Particulars

In the above first embodiment, the prismatic lithium ion battery 1 is used as an example. However, the present invention can be applied to other types of prismatic sealed secondary batteries, and thus the configuration of batteries to which the present invention can be applied is not confined to prismatic lithium ion batteries. For instance, the present invention achieves the same effects as described above when applied to prismatic nickel-cadmium batteries and prismatic Nickel-Metal Hydride batteries.

In the above first to sixth embodiments, the prismatic sealed secondary batteries 1-6 each having the cases 10-60, respectively, which are made of the 3000-series aluminum alloy, are used as examples. However, materials used for the cases 10-60 are not confined to this. For instance, metals shown in Table 1 above can be used as case materials.

The laser beam irradiation parameters of FIG. 2, which are employed at manufacturing the battery according to the first embodiment, are also merely examples, and the present invention is not confined to these. In short, for creating laser irradiation signatures in order to form depressions, what is required is that each of the laser irradiation signatures is made up of the recrystallized portion and the heat-influenced portion. For this purpose, within the spots irradiated by the laser beam, parts having the highest temperature should be set to be no lower than the recrystallization temperature but below the melting point. Here, from the aspect of enhancing workability of the depression formation, it is desirable to set the spot diameter in the range of 2.0 mm and 6.0 mm inclusive.

In the first embodiment, the spot shape of the laser beam LB irradiated on the main plane 10a of the case 10 is round, however, the shape of the laser beam LB of the present invention is not confined to this. For example, the laser beam LB with a rectangular spot shape may be irradiated by providing cylindrical lenses in the light path.

Furthermore, in the above first embodiment, the laser beam LB is irradiated on the main plane 10a of the case 10 in order to form the depressions, however, the present invention is not confined to this and any energy beam, for instance, an electron beam and a plasma beam, can be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A prismatic sealed secondary battery, comprising:
   an electrode assembly including a positive electrode, and a negative electrode, and a separator sandwiched between the positive electrode and the negative electrode;
   a case which is made of a metal material formed in one or more plates, has a prismatic tubular shape with four lateral planes, one open end, and one closed end, and has an internal space in which the electrode assembly is housed, the four lateral planes, each of which has a plate thickness, being composed of two main planes and two secondary planes, the main planes being laid along a direction intersecting thickness of the positive electrode or the negative electrode; and
   a sealing cap joined with the open end to seal the internal space, wherein
   on an area on at least one of the main planes, one or more linear heat strain signatures formed as a result of an application of heat are created, the area being apart from outer lines of the at least one of the main planes,
   linear portion formed within each of the linear heat strain signatures is, on cross section, fanned out inwardly toward the plate thickness from a center of a width of the linear heat strain signature, and is composed of a recrystallized structure, and
   one or more depressions are formed, surrounding the linear heat strain signatures.

2. The prismatic sealed secondary battery of claim 1, wherein the linear portion has been heated at a temperature no lower than a recrystallization temperature but below a melting point of the metal material.

3. The prismatic sealed secondary battery of claim 1, wherein
   when a direction from the sealed open end toward the closed end is a first direction, and a direction perpendicular to the first direction is a second direction, the main plane has a height in the first direction and a width in the second direction when viewed in a plan,
   on the main plane, a surface area ratio of the depressions within a predetermined area is set higher than a surface area ratio of the depressions outside the predetermined area, the predetermined area being a region where a first swath intersects a second swath, the first swath stretching over the main plane in the second direction, and beginning from 10% of the height from an edge of the sealed open end and ending at 40%, the second swath stretching over the main plane in the first direction and occupying 40% of the width in a middle of the main plane in the first direction.

4. The prismatic sealed secondary battery of claim 1, wherein
   the linear heat strain signatures are configured in a shape of one of a straight line, a cross, and a swirl, when the main plane is viewed in a plan.

5. A prismatic sealed secondary battery, comprising:
   an electrode assembly including a positive electrode, and a negative electrode, and a separator sandwiched between the positive electrode and the negative electrode;
   a case which is made of a metal material formed in one or more plates, has a prismatic tubular shape with four lateral planes, one open end, and one closed end, and has an internal space in which the electrode assembly is housed, the four lateral planes, each of which has a plate thickness, being composed of two main planes and two secondary planes, the main planes being laid along a direction intersecting thickness of the positive electrode or the negative electrode; and
   a sealing cap joined with the open end to seal the internal space, wherein
   on at least one of the main planes, one or more linear heat strain signatures formed as a result of an application of heat are created,
   a linear portion formed within each of the linear heat strain signatures is, on cross section, fanned out inwardly toward the plate thickness from a center of a width of the linear heat strain signature, and is composed of a recrystallized structure, wherein the linear portion has been heated at a temperature no lower than a recrystallization temperature but below a melting point of the metal material, and one or more depressions are formed, surrounding the linear heat strain signatures.

6. The prismatic sealed secondary battery of claim 5, wherein when a direction from the sealed open end toward the closed end is a first direction, and a direction perpendicular to the first direction is a second direction, the main plane has a height in the first direction and a width in the second direction when viewed in a plan, on the main plane, a surface area ratio of the depressions within a predetermined area is set higher than a surface area ratio of the depressions outside the predetermined area, the predetermined area being a region where a first swath intersects a second swath, the first swath stretching over the main plane in the second direction, and beginning from 10% of the height from an edge of the sealed open end and ending at 40%, the second swath stretching over the main plane in the first direction and occupying 40% of the width in a middle of the main plane in the first direction.

7. The prismatic sealed secondary battery of claim 5, wherein the linear heat strain signatures are configured in a shape of one of a straight line, a cross, and a swirl, when the main plane is viewed in a plan.

* * * * *